United States Patent
Fu et al.

(10) Patent No.: US 11,828,876 B2
(45) Date of Patent: Nov. 28, 2023

(54) LASER RANGEFINDER HAVING COMMON OPTICAL PATH

(71) Applicant: SHENZHEN RUIERXING ELECTRONIC CO., LTD., Shenzhen (CN)

(72) Inventors: Luxin Fu, Shenzhen (CN); Zhicheng Xing, Shenzhen (CN)

(73) Assignee: SHENZHEN RUIERXING ELECTRONIC CO., LTD., Shenzhen (CN)

(*) Notice: Subject to any disclaimer, the term of this patent is extended or adjusted under 35 U.S.C. 154(b) by 889 days.

(21) Appl. No.: 16/857,166

(22) Filed: Apr. 23, 2020

(65) Prior Publication Data
US 2020/0264283 A1    Aug. 20, 2020

Related U.S. Application Data

(63) Continuation of application No. PCT/CN2018/097271, filed on Jul. 26, 2018.

(51) Int. Cl.
*G01S 7/481*    (2006.01)
*G01S 17/86*    (2020.01)
(Continued)

(52) U.S. Cl.
CPC .............. *G01S 7/4813* (2013.01); *G01S 5/10* (2013.01); *G01S 5/24* (2013.01); *G01S 7/4808* (2013.01);
(Continued)

(58) Field of Classification Search
CPC .............................. G01S 7/4812; G01S 7/4813
See application file for complete search history.

(56) References Cited

U.S. PATENT DOCUMENTS

| 4,780,738 A | * 10/1988 | Fukahori | .................. G02B 7/10 |
| | | | 396/137 |
| 5,859,693 A | * 1/1999 | Dunne | .................. G01C 15/002 |
| | | | 356/141.2 |

(Continued)

FOREIGN PATENT DOCUMENTS

| CN | 103402076 A | 11/2013 |
| CN | 206649157 U | 11/2017 |

(Continued)

OTHER PUBLICATIONS

Machine translation of DE-102006040612-A1 (Year: 2008).*
(Continued)

*Primary Examiner* — Yuqing Xiao
*Assistant Examiner* — Zhengqing Qi (57) ABSTRACT

The present invention relates to a laser rangefinder having common optical path comprising a housing assembly, a control and display assembly mounted in the housing assembly, a mounting device mounted in the housing assembly, an imaging module mounted on the mounting device and a laser module movably mounted on the mounting device longitudinally next to the imaging module, the laser module being electrically connected with the control and display assembly, the laser module comprising a laser emitting apparatus, a laser receiving apparatus and a reference point indicating apparatus, wherein a light path of the laser emitting apparatus and a light path of the laser receiving apparatus are configured to be independent to a light path of the reference point indicating apparatus, an optical axis of light path of the laser emitting apparatus shooting at the target object and an optical axis of the reference point indicating apparatus are collinear.

17 Claims, 4 Drawing Sheets

(51) Int. Cl.
- G01S 17/08 (2006.01)
- G01S 5/10 (2006.01)
- G01S 5/24 (2006.01)
- G01S 7/48 (2006.01)
- G01S 7/487 (2006.01)
- G02B 26/00 (2006.01)
- G02B 6/12 (2006.01)

(52) U.S. Cl.
CPC ............ *G01S 7/4876* (2013.01); *G01S 17/08* (2013.01); *G01S 17/86* (2020.01); *G02B 26/00* (2013.01); *G02B 2006/12121* (2013.01); *G05B 2219/37281* (2013.01); *G05B 2219/37425* (2013.01)

(56) References Cited

U.S. PATENT DOCUMENTS

| | | | | |
|---|---|---|---|---|
| 6,433,860 | B1* | 8/2002 | Ohishi | G01S 17/86 356/5.01 |
| 7,184,088 | B1* | 2/2007 | Ball | G01S 17/89 348/348 |
| 2001/0050763 | A1* | 12/2001 | Shirai | G01S 7/4812 356/5.1 |
| 2005/0057745 | A1* | 3/2005 | Bontje | G01C 15/002 356/139.03 |
| 2005/0198885 | A1* | 9/2005 | Staley, III | F41G 1/48 42/142 |
| 2014/0063261 | A1* | 3/2014 | Betensky | G02B 23/145 348/158 |
| 2018/0074287 | A1* | 3/2018 | Nystrom | G03B 13/36 |

FOREIGN PATENT DOCUMENTS

| | | | | |
|---|---|---|---|---|
| DE | 102006040612 A1 * | 3/2008 | ............ | B23K 26/04 |
| JP | 2005331923 A * | 12/2005 | ............ | G02B 21/36 |

OTHER PUBLICATIONS

Machine translation of JP2005331923A (Year: 2005) (Year: 2005).*
International Search Report issued in corresponding International application No. PCT/CN2018/097271, dated Apr. 3, 2019.
Written Opinion of the International Searching Authority for No. PCT/CN2018/097271.

* cited by examiner

Laser emitting light path

FIG. 8a

Laser receiving light path

FIG. 8b

Reference point light path

LASER RANGEFINDER HAVING COMMON OPTICAL PATH

TECHNICAL FIELD

The present invention relates to photoelectric measurement devices, and particularly to a laser rangefinder having common optical path.

BACKGROUND

Laser ranging is a method which uses lasers to accurately determine a distance to a target object, in which it is required to aim at a target object during measurement. Typical laser rangefinders can be combined with digital imaging devices to aim at target objects through display of the digital imaging devices. Such combined assembly generally includes multiple optical paths, i.e. a laser transmitting path and a laser receiving path for laser distance measuring as well as a digital imaging light path. However, such design has three optical lenses, thereby destroying integrality of the product.

The typical combined assembly requires focusing when observing objects at different distances in such a manner that determining a focal length by means of image comparison algorithm of an imaging sensor. For an object at long-distance, an image imaged on a surface of an imaging sensor is too small, so that data values cannot be accurately obtained when an image comparison for a focus of the object at long-distance is carried out, and only a depth of field for the image can be used to compensate.

SUMMARY

In order to solve the above technical problem in the prior art, the present invention provides a laser rangefinder having common optical path, having a laser ranging light path and a digital imaging light path which are designed to be coaxial, i.e., as common optical path, which significantly reduces the size of the apparatus and ensures the integrality of the product.

Furthermore, depending on a relevance between a focus and a distance of an observed object during observing different objects through the lens of the digital imaging device, the laser rangefinder having common optical path according to the present invention can automatically adjust a focal length of the digital imaging by a control system according to laser distance measured datum, and adequately use ranging values of the distance measuring as parameters for adjusting focal lengths of the lens in order to take full advantage of the ranging values. The operating efficiency can be significantly improved, especially when a magnification of the digital imaging is desired to be adjusted.

The present invention provides a laser rangefinder having common optical path comprising: a housing assembly; a control and display assembly mounted in the housing assembly; a mounting device and movably mounted in the housing assembly; an imaging module received in the housing assembly and mounted on the mounting device, the imaging module being configured to perform digital imaging of a target object; and a laser module movably mounted on the mounting device longitudinally next to the imaging module, the laser module being electrically connected with the control and display assembly, and the laser module comprising a laser emitting apparatus, a laser receiving apparatus and a reference point indicating apparatus, wherein a light path of the laser emitting apparatus and a light path of the laser receiving apparatus are configured to be independent to a light path of the reference point indicating apparatus, and an optical axis of light path of the laser emitting apparatus shooting at the target object and an optical axis of the reference point indicating apparatus are collinear.

In some embodiments, the laser module is hinged to the housing assembly by a movable ball joint, and a rear end of the laser module frame is connected with the housing assembly by a vertical adjusting mechanism and a horizontal adjusting mechanism.

In some embodiments, the mounting device is hinged to the housing assembly by another ball joint, an end of the mounting device is connected with the housing assembly by another vertical adjusting mechanism and another horizontal adjusting mechanism.

In some embodiments, the imaging module comprises a lens set, an imaging sensor, a mounting member for the lens set, a magnification adjusting worm and a focal length adjusting worm, the mounting member for the lens set is configured to mount the lens set and the imaging sensor onto the mounting device.

In some embodiments, the control and display assembly is configured to control the magnification adjusting worm and the focal length adjusting worm according to a laser measured result in order to respectively adjust a magnification and a focal length of the lens set.

In some embodiments, the laser module comprises a laser module frame, and the laser emitting apparatus, the laser receiving apparatus and the reference point indicating apparatus are mounted in the laser module frame.

In some embodiments, the laser module frame comprises a tubular body.

In some embodiments, the laser emitting apparatus comprises a laser emitter for emitting a laser beam, a first holophote for total reflection of the laser beam, a first laser focusing lens for converging the laser beam to form a collimating ranging laser, a bandpass filter lens for allowing the ranging laser to pass through but preventing natural light from passing through, and a dichroic mirror for reflecting the ranging laser and allowing the natural light to pass through.

In some embodiments, the laser receiving apparatus comprises the dichroic mirror for reflecting the ranging laser and allowing the natural light to pass through, the bandpass filter lens for allowing the ranging laser to pass through but preventing the natural light from passing through, a second laser focusing lens for converging the returned ranging laser, a second holophote for total reflection of the converged ranging laser, and a laser receiver for transforming the received optical signals into electrical signals.

In some embodiments, the emitting apparatus and the laser receiving apparatus share the same dichroic mirror and the same bandpass filter lens.

In some embodiments, the laser emitter and the laser receiver are arranged under a bottom side of the tubular body of the laser module frame, the first holophote and the second holophote are arranged side by side in a same plane in front of and inclined to the laser emitter and the laser receiver respectively, the first laser focusing lens and the second laser focusing lens are respectively arranged over the first holophote and the second holophote, and the bandpass filter lens is arranged over the first laser focusing lens and the second laser focusing lens and parallel thereto.

In some embodiments, the bandpass filter lens is arranged on the bottom surface of the tubular body.

In some embodiments, the dichroic mirror is arranged over the bandpass filter lens, inclinedly fixed inside the tubular body of the laser module frame and divides the inner space of the tubular body into two parts.

In some embodiments, the reference point indicating apparatus comprises a light emitting diode for generating a visible indicating light, a grating filter for limiting a size of an aperture for emitting the visible indicating light, a reflector for reflecting the limited visible indicating light, and a concave focusing lens for converging the visible indicating light into a real image point to form an indicating reference point.

In some embodiments, the concave focusing lens is arranged at a rear side of the dichroic mirror, the light emitting diode and the raster sheet are arranged near a side of the concave focusing lens, and the reflector is arranged at a rear side of the light emitting diode and in a light path of the light emitting diode.

In some embodiments, the laser rangefinder further comprises an eyepiece set which is removably mounted at a rear end of the housing assembly so that an eyepiece center of the eyepiece set is collinearly located on an optical axis of light paths which are emitted from the laser emitting apparatus and shoot at a target object.

The present invention provides a laser rangefinder having common optical path comprising: a housing assembly; and a laser module received in the housing assembly, the laser module comprising: a frame having a tubular body, and a laser emitting apparatus, a laser receiving apparatus and a reference point indicating apparatus mounted in the frame, wherein a light path of the laser emitting apparatus and a light path of the laser receiving apparatus are configured to be independent to a light path of the reference point indicating apparatus, and an optical axis of light path of the laser emitting apparatus shooting at a target object and an optical axis of the reference point indicating apparatus are collinear; the laser emitting apparatus comprises a laser emitter arranged under a bottom side of the tubular body, a first holophote inclinedly arranged in front of the laser emitter, a first laser focusing lens arranged above the first holophote, a bandpass filter lens, and a dichroic mirror; and the laser receiving apparatus comprises a laser receiver arranged under the bottom side of the tubular body adjacent to the laser emitter, a second holophote inclinedly arranged in front of the laser receiver at a side of the first holophote, a second laser focusing lens arranged above the second holophote, a dichroic mirror, and a bandpass filter lens.

In some embodiments, the laser emitting apparatus and the laser receiving apparatus share the same dichroic mirror and the same bandpass filter lens.

In some embodiments, the bandpass filter lens is arranged on the bottom surface of the tubular body, and the dichroic mirror is arranged over the bandpass filter lens, inclinedly fixed inside the tubular body of the laser module frame and divides the inner space of the tubular body into two parts.

The laser rangefinder having common optical path according to the present invention provides a system with a single common optical path instead of typical systems with multiple optical paths, and improves aiming performance, and reduces the volume of the apparatus so that the integrality of the produce is ensured. Moreover, the focal length of the lens set is adjusted directly by using these laser distance measured data. The present invention adequately uses ranging values of the distance measuring as parameters for adjusting focal lengths of the lens in order to take full advantage of the ranging values. The present invention has a faster operating speed and higher accuracy, especially when a magnification is desired to be adjusted, and can correspondingly adjust these focal lengths and the operating efficiency is highly improved.

DESCRIPTION OF THE EMBODIMENTS

FIGS. 1 to 7 show a laser rangefinder 100 with digital imaging having common optical path according to an embodiment of the present invention. The laser rangefinder 100 generally includes a housing assembly 510, and a control and display assembly, a mounting device, an imaging module and a laser module which are mounted in the housing assembly 510. The imaging module and the laser module are movably connected to the housing assembly 510.

Figure 1:
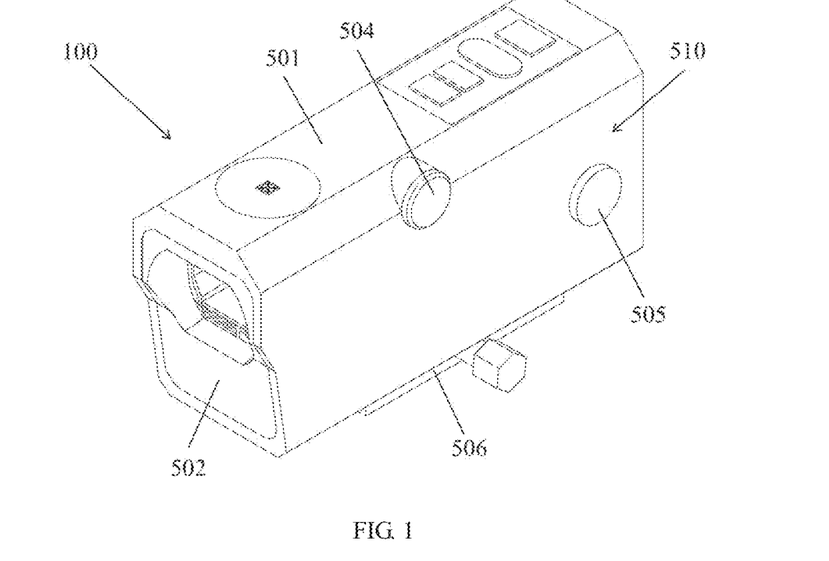
FIG. 1 is a schematic view of a laser rangefinder having common optical path according to an embodiment of the present invention.
Figure 2:
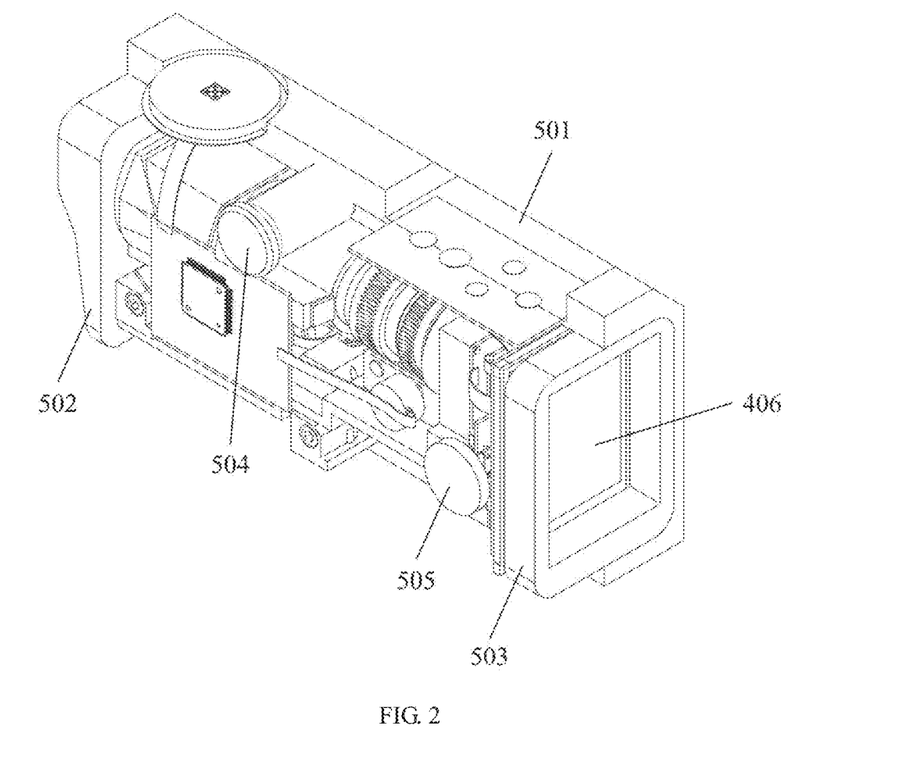
FIG. 2 shows an interior of the laser rangefinder having common optical path of FIG. 1, with a housing assembly thereof partially removed.

Referring to FIGS. 1 and 2, the housing assembly 510 of the laser rangefinder 100 includes a shell 501, a front cover 502, a rear cover 503 and a support 506.

Figure 3:
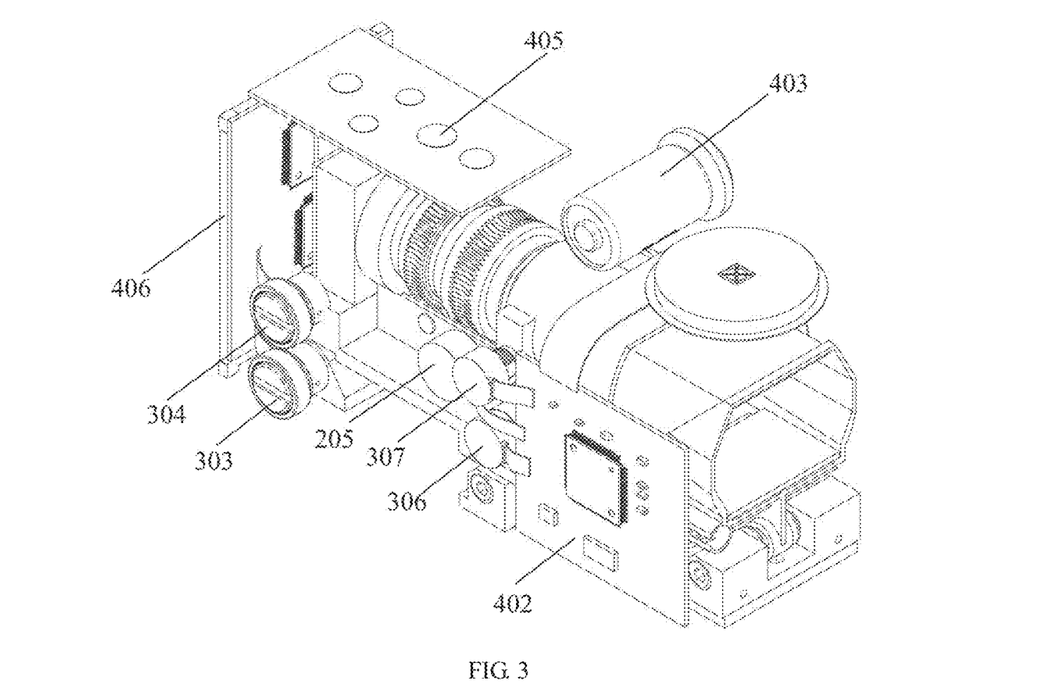
FIG. 3 is a schematic view of the laser rangefinder having common optical path of FIG. 1, with the housing assembly thereof removed.
Figure 4:
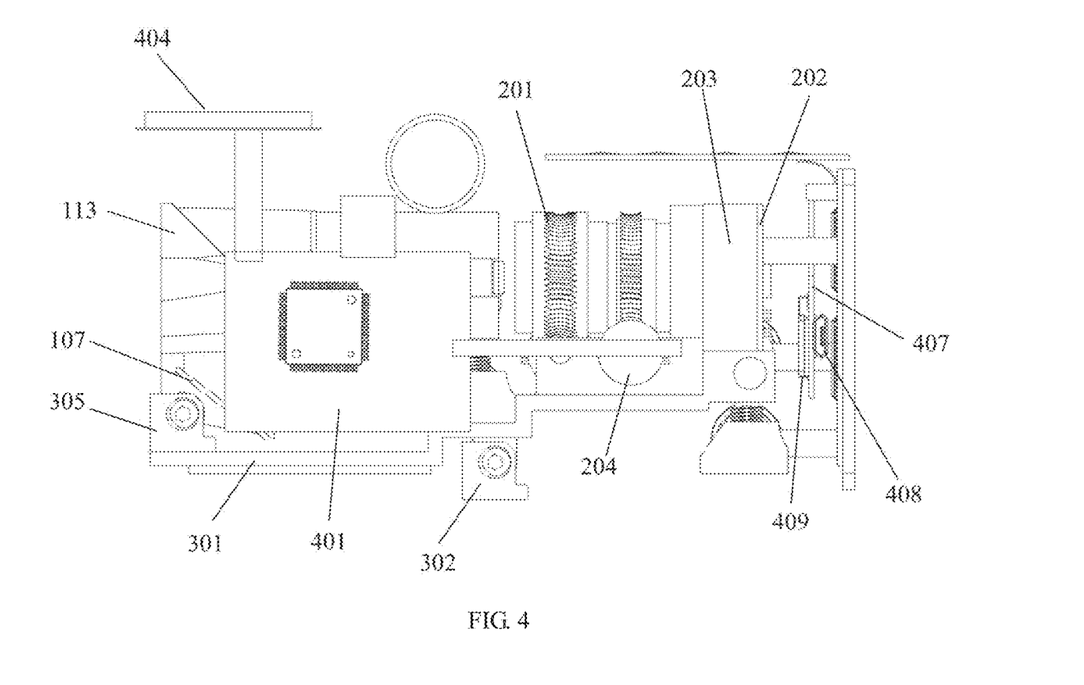
FIG. 4 is a side view of the laser rangefinder having common optical path of FIG. 1, with the housing assembly thereof removed.

FIGS. 3 and 4 respectively show a schematic view of an interior of the laser rangefinder 100 from different aspects. The control and display assembly includes a control module, a display 406 and a key control panel 405. Preferably, the control module includes a signal processing circuit 401 and a servo control circuit 402. The signal processing circuit 401 and/or the servo control circuit 402 are provided with one or more sensors selected from the following: wind speed and direction sensors 404, orientation sensors, angle sensors, temperature sensors, humidity sensors, barometric pressure sensors, global positioning systems and the like. Preferably, a wireless transmission module is provided in the control module, by means of which data can be transmitted between the laser rangefinder 100 and another device via wireless transmission. Preferably, the control and display assembly further includes an interface circuit board 407, and data can be transmitted between the laser rangefinder 100 and the another device by wire transmission via a USB interface 408 provided on the interface circuit board 407. In this case, the housing assembly 510 is preferably provided with an protective cover 505 for the interface circuit board. Preferably, the interface circuit board 407 may include a SD card slot 409 for receiving a SD card for storing datum. Preferably, the control and display assembly further includes a power supply 403, which can be a lithium battery, a nickel-cadmium battery and the like. In this case, the housing assembly is preferably provided with a further cover 504 for the power supply.

The mounting device includes a mounting seat 301, a middle portion of which is hinged to the shell 501 by a first ball joint 302, and thus the mounting seat 301 is movably mounted in an inner space of the shell 501. A front end of the mounting seat 301 is connected with the shell 501 by a first vertical adjusting mechanism 303 and a first horizontal adjusting mechanism 304. As such, inclined angles of the mounting seat 301 as well as the components attached thereon relative to the housing assembly can be controlled accurately.

Figure 5:
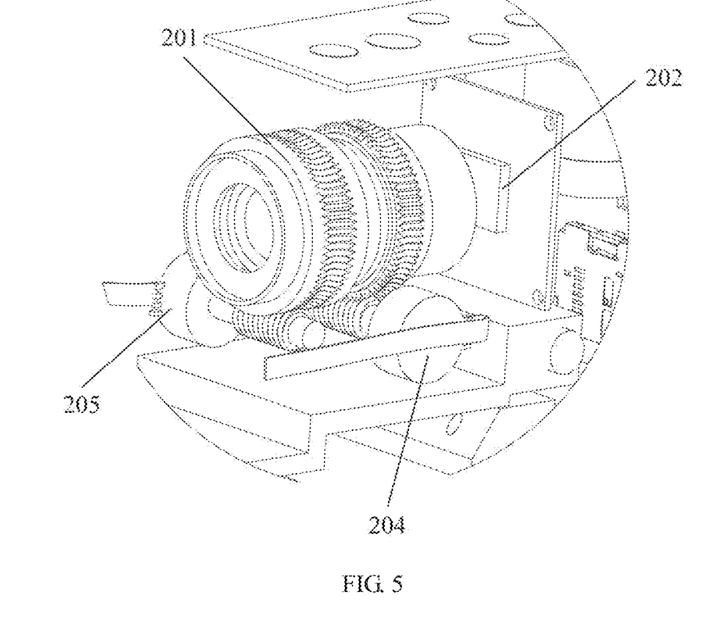
FIG. 5 is a schematic view of an imaging module of the laser rangefinder having common optical path of FIG. 1.

The imaging module is arranged on the mounting seat 301, referring to FIG. 5. The imaging module includes a lens set 201, an imaging sensor 202, a mounting member 203 for the lens set, a magnification adjusting worm 204 and a focal length adjusting worm 205. The mounting member 203 for the lens set is configured to mount the lens set 201 and the imaging sensor 202 onto the mounting seat 301. To clearly show the imaging sensor 202, the mounting member 203 for the lens set is omitted in FIG. 5. The magnification adjusting worm 204 and the focal length adjusting worm 205 are respectively configured to adjust the magnifications and focal lengths of the lens set 201. In this embodiment, the magnification adjusting worm 204 and the focal length adjusting worm 205 are controlled by the control module. The imaging sensor 202 is used to collect images captured by the lens set 201, the collected images can be displayed on the display 406 after having been processed by the control and display assembly, and may be stored and recorded in a memorizer (for example, a SD card).

The laser module for range finding and sighting is arranged on the mounting seat 301 next to the imaging module along an axial or longitudinal direction of the mounting seat. To clearly show the laser module and a connection relationship between the laser module and the mounting seat 301, the control and display assembly and the imaging module are omitted in FIG. 6 on the basis of FIG. 3.

Figure 6:
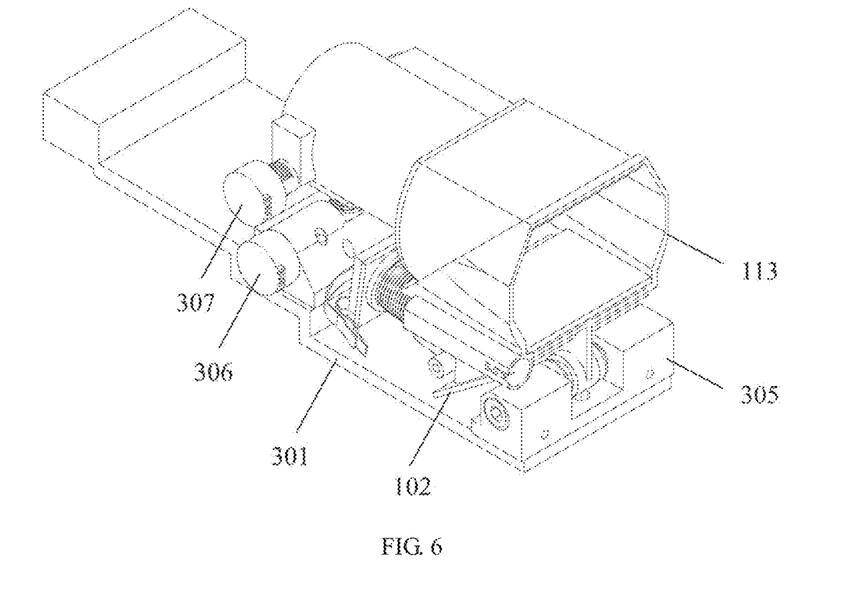
FIG. 6 is a schematic view of a laser module of the laser rangefinder having common optical path of FIG. 1.

The laser module includes a laser module frame 113 with a tubular body. The tubular body has two open ends and at least one bottom surface perpendicular to one of these ends. A front end of the laser module frame 113 is hinged to the mounting seat 301 by a second movable ball joint 305, and thus the laser module frame 113 is movably mounted on the mounting seat 301. A back end of the laser module frame 113 is connected with the mounting seat 301 by a second vertical adjusting mechanism 306 and a second horizontal adjusting mechanism 307. As such, inclined angles of the laser module frame 113 as well as the components attached thereon relative to the mounting seat 301 can be controlled accurately.

Figure 7:
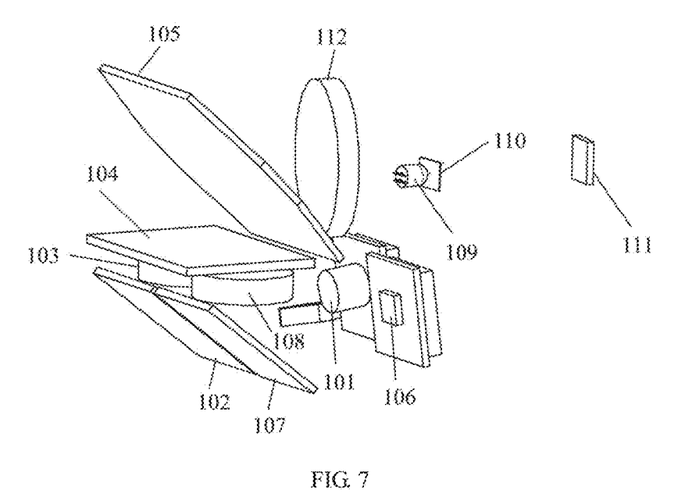
FIG. 7 is a schematic view of optical components of the laser module of the laser rangefinder having common optical path of FIG. 1.

Referring to FIG. 7, the laser module frame 113 is provided with a plurality of optical components. For clarity, the laser module frame 113 is omitted in FIG. 7 and only these optical components are shown. The optical components of the laser module includes: a laser emitting apparatus, a laser receiving apparatus and a reference point indicating apparatus. The laser emitting apparatus includes: a laser emitter 101 for emitting a laser beam, a first holophote 102 for total reflection of the laser beam, a first laser focusing lens 103 for converging the laser beam to form a collimating ranging laser, a bandpass filter lens 104 for allowing the ranging laser to pass through but preventing the natural light from passing through, and a dichroic mirror 105 for reflecting the ranging laser and allowing the natural light to pass through. The laser receiving apparatus includes: the dichroic mirror 105 for reflecting the ranging laser and allowing natural light to pass through, the bandpass filter lens 104 for allowing the ranging laser to pass through and preventing the natural light from passing through, a second laser focusing lens 108 for converging the returned ranging laser, a second holophote 107 for total reflection of the converged ranging laser, and a laser receiver 106 for transforming the received optical signals into electrical signals. Preferably, the laser emitting apparatus and the laser receiving apparatus share the same dichroic mirror 105 and the same bandpass filter lens 104. The reference point indicating apparatus includes: a light emitting diode 109 for generating a visible indicating light, a grating filter 110 for limiting a size of an aperture for emitting the visible indicating light, a reflector 111 for reflecting the limited visible indicating light, and a concave focusing lens 112 for converging the visible indicating light into a real image point, i.e. an indicating reference point.

The laser emitter 101 and the laser receiver 106 are arranged under a bottom side of the tubular body of the laser module frame 113. The first holophote 102 and the second holophote 107 are arranged side by side in a same plane in front of and inclined to the laser emitter 101 and the laser receiver 106 respectively. The first laser focusing lens 103 and the second laser focusing lens 108 are respectively arranged over the first holophote 102 and the second holophote 107, and preferably attached on the bottom surface of the tubular body and parallel to it. The bandpass filter lens 104 is arranged over the first laser focusing lens 103 and the second laser focusing lens 108 and parallel to them, and also preferably arranged on the bottom surface of the tubular body. The dichroic mirror 105 is arranged over the bandpass filter lens 104, inclinedly fixed inside the tubular body of the laser module frame 113 and divides the inner space of the tubular body into two parts. The concave focusing lens 112 is arranged at the rear side of the dichroic mirror 105. The light emitting diode 109 and the raster sheet 110 are arranged near a side of the concave focusing lens 112. The reflector 111 is arranged at a rear side of the light emitting diode 109 and in a light path of the light emitting diode 109. The concave imaging lens 112 in this embodiment is a concave lens, and the concave imaging lens 112 images the object by 1:1 after the natural light reflected by the object to be observed passes there through (at this time, an image of the object to be observed, which is observed visually by the user through the natural light observation path of the laser rangefinder with digital imaging having common optical path with laser separated in front of an imaging lens, is the same as an image observed by the user normally visually).

In this embodiment, the first holophote 102 and the second holophote 107 are arranged opposite to the dichroic mirror 105. Laser light transmitted from the laser emitter 101 illuminates the object to be observed after being reflected by the first holophote 102 and then the dichroic mirror 105, which may enable the laser emitter 101 to be mounted and arranged in parallel with the natural light observation path, such that a transmitting direction of the laser light is parallel to a natural light propagation direction during visual observation. Moreover, the laser light reflected by the object to be observed is received by the laser receiver 106 after being reflected by the dichroic mirror 105 and then by the second holophote 107.

In this embodiment, the first laser focusing lens 103 is mounted between the dichroic mirror 105 and the first holophote 102, and the second laser focusing lens 108 is mounted between the dichroic mirror 105 and the second holophote 107. In this way, the laser emitter 101 transmits the laser light, and after the laser light illuminates on the first holophote 102, there is a certain extent of scattering in a reflection process of the first holophote 102, in the meanwhile, the scattered laser light is condensed again by the first laser focusing lens 103 to form intensive parallel laser light, which illuminates the object to be observed after being reflected by the dichroic mirror 105 again. As such, the laser light may intensively illuminate the object to be observed after being reflected twice. When the laser light illuminates the object to be observed, and after the laser light is reflected by the scene to be observed, there is a certain divergence in the laser light reflected by the object to be observed. Similarly, after being condensed by the second laser focusing lens 108, the diverged laser light reflected by the object to be observed may be reflected by the second holophote 107 to the laser receiver 106 for being received. As such, it is possible to ensure that laser-transmission propagating laser light and laser-reception propagating laser light are well isolated without interference to one another, thereby avoiding the problem of short-range interference and achieving the purpose of inhibiting the short-distance blind zone.

In this embodiment, the dichroic mirror 105 separates the natural light from the laser light when original states of the natural light and the laser light have not yet changed. The separated natural light enters components (for example, the concave focusing lens 112) of an optical imaging system at the rear end. Transmitting and receiving energies of the laser light are maximized because of only passing through the reflecting path. Due to a coating characteristic of the dichroic mirror 105, the laser light may be sufficiently separated from the natural light, so that inclusions of the laser light in the optical instrument are minimized, thereby ensuring a safer optical use environment for the user.

Figure 8A:
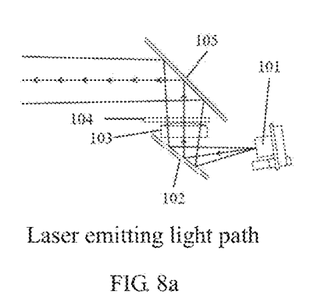
FIG. 8a is a schematic view of a laser emitting apparatus of the laser module.
Figure 8B:
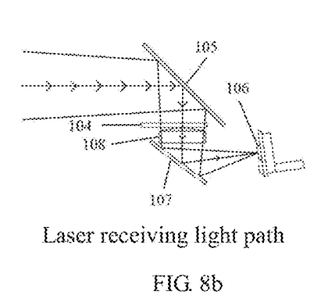
FIG. 8b is a schematic view of a laser receiving apparatus of the laser module.
Figure 8C:
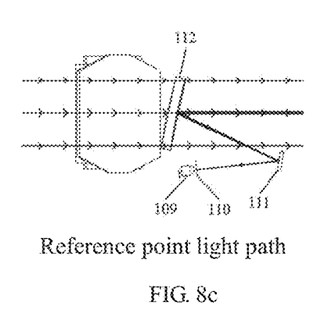
FIG. 8c is a schematic view of a reference point indicating apparatus of the laser module.

An operating manner of the above optical components will be explained in more detail with reference to FIGS. 8a to 8c. FIGS. 8a to 8c respectively show the necessary elements for achieving its own light paths of the laser emitting apparatus, the laser receiving apparatus and the reference indicating apparatus.

FIG. 8a shows the light path of the laser emitting apparatus in a side view. The laser emitter 101 emits a laser beam with a certain waveband (for example, a waveband of 905 nm), the laser beam is first totally reflected by the first holophote 102 and then passes through the first laser focusing lens 103 and is converged to form a collimating ranging laser beam, and the ranging laser beam passes through the bandpass filter lens 104 and reaches the dichroic mirror 105 and then is reflected to shoot at a indicated target object. Referring to FIG. 8b, the light path of the laser receiving apparatus are shown in a side view. The ranging laser beam will be reflected after reaching the indicated target object. The reflected ranging laser beam partially returns back to the dichroic mirror 105 and then passes through the bandpass filter lens 104 and the second laser focusing lens 108 in sequence and has been converged at the second laser focusing lens 108, and then the converged ranging laser beam reaches the second holophote 107 and is reflected there and finally reach the laser receiver 106 which transforms the received optical signal into an electrical signal. With this, a distance between the target object and the laser rangefinder is determined by measurement. The dichroic mirror 105 prevents the ranging laser beam from passing therethrough to a natural light area at a rear side of the dichroic mirror 105. Moreover, the bandpass lens 104 prevents other lights with different wave bands from the ranging lasers enter into the laser module frame 113 from being received by the laser receiver and thus avoids interference from other lights to the ranging laser beam.

Furthermore, the reference point indicating apparatus is provided at the rear side of the dichroic mirror 105. Specifically, referring to FIG. 8c, light path of the reference point indicating apparatus is shown in a top view. The light emitting diode 109 generates visible indicating lights, the visible indicating light passes through the aperture of the grating filter 110 for limiting a size thereof and then shoot at the reflector 110 and is reflected thereby, and then reflected by the concave focusing lens 112 and converged at a certain point to form a real image point, i.e. an indicating reference point. The light path for the indicating reference point is provided so that an optical axis of the indicating reference point and an optical axis of these ranging lasers shooting at the target object are collinear. Therefore, the indicating reference point is also referred as a laser indicating reference point. The laser indicating reference point can be captured by the imaging sensor 202 together with the natural lights. Therefore, a position of the laser indicating reference point on the image formed by the nature lights shown on a screen of the display is an actual position targeted by these ranging lasers, so that the target object can be aimed.

When performing a laser distance measurement, the key control panel 405 is triggered to drive the signal processing circuit 401 to generate a signal, the laser emitter 101 receives the signal and then emits ranging laser beam, the laser receiver 106 receives the ranging laser beam reflected from the target object and then transforms the optical signal into an electrical signal, the electrical signal is transmitted to the signal processing circuit 401 to be processed, and then these processed measured data is also transmitted to the display 406 to display a measured result. In the meantime, the measured data is also sent to the servo control circuit 402, to drive the focal length adjusting worm 205 to move the lens set 201 to adjust a focal length, i.e. the focal length of the lens set 201 is controlled by these actually measured data. Therefore, a closed-loop control is achieved and a natural light image captured by the imaging sensor 202 maintains an optimal resolution.

Furthermore, a magnification of the lens set 201 may need be adjusted during use, in that case, the key control panel 405 can be triggered to drive the control module to control the magnification adjusting worm 204 to move and drive the lens set 201 to adjust the magnification. After the adjustment, the focal length may be significantly shifted due to changes of physical positions of the optical members, so that resolutions of the images captured by the imaging sensor 202 may reduces. Therefore, when the magnification adjusting worm 204 is moving, the signal processing circuit 401 and the servo control circuit 402 cooperatively work with the laser measured data to control movements of the focal length adjusting worm 205 to drive the lens set 201 to accurately adjust the focal length, so that a natural light image captured by the imaging sensor 202 maintains an optimal resolution.

Figure 9:
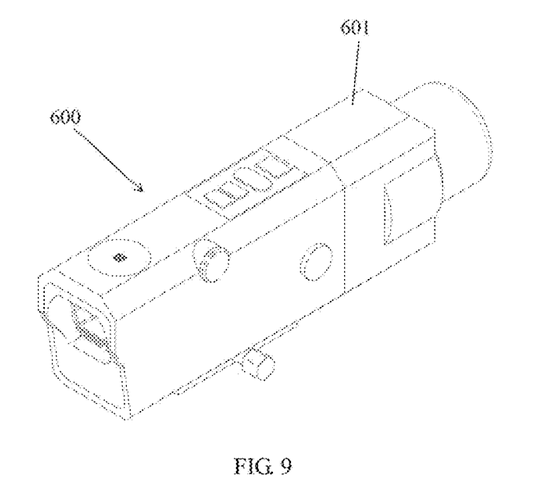
FIG. 9 is a schematic view of a laser rangefinder having common optical path according to another embodiment of the present invention.

Referring to FIG. 9, a schematic view of the laser rangefinder according to another embodiment of the present invention is shown. This embodiment differs from the first embodiment shown in FIG. 1 in that, an eyepiece set 601 is additionally provided, which is removably mounted at a rear end of the display. An eyepiece center of the eyepiece set 601 is located on an optical axis of light paths which are emitted from the laser emitting apparatus and shoot at a target object are collinear. A user can directly observe the display or through the eyepiece according to personal preference.

Methods of operation of the laser rangefinder according to the present invention will be explained in detail in the following.

I. The laser rangefinder according to the present invention can be used independently.

The laser rangefinder according to the present invention can be used independently. The laser indicating reference point, the center of the screen of the display, or any point on the screen of the display can be regarded as the reference center of the product.

In case that the laser indicating reference point is regarded as the reference center of the product, the key control panel 405 is triggered to drive the control module to control the second vertical adjusting mechanism 306 and the second horizontal adjusting mechanism 307 to move the laser module relative to the mounting seat 301, and in turn to move the indicating reference point to any position on the screen of the display, in the meanwhile, the above closed-loop control make an area where the laser indicating reference point stays have an optimal resolution for images. This manner will leave a physical red point in a recorded image or video.

In case that the center of the screen of the display is regarded as the reference center of the product, a center point of the screen of the display is regarded as a reference point of the screen of the display. The key control panel 405 is triggered to drive the control module to control the second vertical adjusting mechanism 306 and the second horizontal adjusting mechanism 307 to move the laser module relative to the mounting seat 301, and in turn to move the indicating reference point to overlap the reference point (i.e. the center point of the screen of the display) on the screen of the display. After this, during use, the laser indicating reference point always coincides with the center point of the screen of the display, and the laser module is not moved relative to the mounting seat 301, i.e. the laser module is fixed relative to the mounting seat 301. If a sight alignment is required to change, the key control panel 405 is triggered to drive the control module to control the first vertical adjusting mechanism 303 and the first horizontal adjusting mechanism 303 to move the mounting seat 301 and the imaging module and the laser module attached thereon relative to the shell 501, i.e. the reference point displayed on the screen of the display is stationary, an image captured by the imaging sensor 202 is moved. Similarly, the above closed-loop control make an area where the center area of the screen of the display stays have an optimal resolution for images. This manner cannot leave a physical red point in a recorded image or video.

In case that any point of the screen of the display is regarded as the reference center of the product, its operating manner is basically the same as the operation when the center of the screen of the display is regarded as the reference center of the product, the difference is that the reference point of the screen of the display may not be the center point of the screen of the display, but any point is first required to be defined on the screen of the display and is regarded as the reference point of the screen of the display, and then the indicating reference point is moved to overlap the reference point (rather than the center point of the screen of the display) on the screen of the display, these two points are maintained under the coincident state and are fixed relative to the screen of the display, only the image is moved to perform an aiming. The reference point area of the screen of the display is an area having an optimal resolution for images.

After the above adjustment, target object can be aimed at and the key control panel can be triggered to perform a distance measuring.

II. The laser rangefinder according to the present invention may be used with other products.

The laser rangefinder according to the present invention may also be attached to and cooperate with other products (for example, weapons). Here, the center of the screen of the display or any point of the screen of the display can be regarded as the reference center of the product.

In case that the center of the screen of the display is regarded as the reference center of the product, the center point of the screen of the display is regarded as the reference point of the screen of the display, the first vertical adjusting mechanism 303 and the first horizontal adjusting mechanism 304 are first controlled to move the mounting seat 301 and the imaging module and the laser module attached thereon relative to the shell 501, the reference point of the screen of the display is adjusted to overlap the aiming center of the other device. Then, the second vertical adjusting mechanism 306 and the second horizontal adjusting mechanism 307 are controlled to move the laser module relative to the mounting seat 301, and in turn to move the laser indicating reference point to the reference point (i.e. the center point of the screen of the display) on the screen of the display. With this, three points including the laser indicating reference point, the reference point of the screen of the display and the aiming center of other device can be overlapped. A user can continue to keep the laser indicating reference point on or off according to personal preference.

In case that any point of the screen of the display is regarded as the reference center of the product, its operating manner is basically the same as the operation when the center of the screen of the display is regarded as the reference center of the product, the difference is that the reference point of the screen of the display may not be the center point of the screen of the display, but the aiming center of other device is first required to be defined as the reference point of the screen of the display, and thus it is no longer required to move the mounting seat 301 and the imaging module and the laser module attached thereon, which are as a whole, relative to the shell 501, and then the laser indicating reference point is moved to overlap the reference point of the screen of the display. Therefore, three points including the laser indicating reference point, the reference point of the screen of the display and the aiming center of other device can be overlapped.

After the above adjustment, target object can be aimed at and the key control panel may be triggered to perform operations of a distance measuring and other device.

The above is only preferred embodiments of the present invention, and is not intended to limit the present invention. Any modifications, equivalent substitutions and improvements made within the spirit and principles of the present invention should be included in the scope of protection of the present invention.

| List of Reference numerals | |
|---|---|
| 100 | laser rangefinder |
| 101 | laser emitter |
| 102 | first holophote |

-continued

| | List of Reference numerals |
|---|---|
| 103 | first laser focusing lens |
| 104 | bandpass filter lens |
| 105 | dichroic mirror |
| 106 | laser receiver |
| 107 | second holophote |
| 108 | second laser focusing lens |
| 109 | light emitting diode |
| 110 | raster sheet |
| 111 | reflector |
| 112 | concave focusing lens |
| 113 | laser module frame |
| 201 | lens set |
| 202 | imaging sensor |
| 203 | lens set mounting member |
| 204 | magnification adjusting worm |
| 205 | focal length adjusting worm |
| 301 | mounting seat |
| 302 | first ball joint |
| 303 | first vertical adjusting mechanism |
| 304 | first horizontal adjusting mechanism |
| 305 | second movable ball joint |
| 306 | second vertical adjusting mechanism |
| 307 | second horizontal adjusting mechanism |
| 401 | signal processing circuit |
| 402 | servo control circuit |
| 403 | power supply |
| 404 | wind speed and direction sensors |
| 405 | key control panel |
| 406 | display |
| 407 | interface circuit board |
| 408 | USB interface |
| 409 | SD card slot |
| 501 | shell |
| 502 | front cover |
| 503 | rear cover |
| 504 | cover for the power supply |
| 505 | protective cover for the interface circuit board |
| 506 | support |
| 510 | housing assembly |
| 600 | laser rangefinder |
| 601 | eyepiece set |

What is claimed is:

1. A laser rangefinder having common optical path comprising:
a housing assembly;
a control and display assembly mounted in the housing assembly;
a mounting device movably mounted in the housing assembly;
an imaging module received in the housing assembly and mounted on the mounting device, the imaging module being configured to perform digital imaging of a target object; and
a laser module movably mounted on the mounting device longitudinally next to the imaging module, the laser module being electrically connected with the control and display assembly, and the laser module comprising a laser emitting apparatus, a laser receiving apparatus and a reference point indicating apparatus,
wherein a light path of the laser emitting apparatus and a light path of the laser receiving apparatus are configured to be independent to a light path of the reference point indicating apparatus, and an optical axis of the light path of the laser emitting apparatus shooting at the target object and an optical axis of the reference point indicating apparatus are collinear;
the laser emitting apparatus comprises a laser emitter for emitting a laser beam, a first holophote for reflection of the laser beam, a first laser focusing lens for converging the laser beam to form a collimating ranging laser, a bandpass filter lens for allowing the ranging laser to pass through but preventing natural light from passing through, and a dichroic mirror for reflecting the ranging laser and allowing the natural light to pass through.

2. The laser rangefinder having common optical path according to claim 1, wherein an end of the mounting device is connected with the housing assembly by another vertical adjusting mechanism and another horizontal adjusting mechanism.

3. The laser rangefinder having common optical path according to claim 1, wherein the laser module comprises a laser module frame.

4. The laser rangefinder having common optical path according to claim 1, wherein the laser rangefinder further comprises an eyepiece set which is removably mounted at a rear end of the housing assembly so that an eyepiece center of the eyepiece set is collinearly located on the optical axis of the light path which is emitted from the laser emitting apparatus and shoot at the target object.

5. The laser rangefinder having common optical path according to claim 1, wherein the imaging module comprises a lens set, an imaging sensor, a mounting member for the lens set, a magnification adjusting worm and a focal length adjusting worm, the mounting member for the lens set is configured to mount the lens set and the imaging sensor onto the mounting device.

6. The laser rangefinder having common optical path according to claim 5, wherein the control and display assembly is configured to control the magnification adjusting worm and the focal length adjusting worm according to a laser measured result in order to respectively adjust a magnification and a focal length of the lens set.

7. The laser rangefinder having common optical path according to claim 1, wherein a rear end of a laser module frame is connected with the housing assembly by a vertical adjusting mechanism and a horizontal adjusting mechanism.

8. The laser rangefinder having common optical path according to claim 7, wherein the laser module frame comprises a tubular body.

9. The laser rangefinder having common optical path according to claim 8, wherein the laser receiving apparatus comprises the dichroic mirror for reflecting the ranging laser and allowing the natural light to pass through, the bandpass filter lens for allowing the ranging laser to pass through but preventing the natural light from passing through, a second laser focusing lens for converging the returned ranging laser, a second holophote for reflection of the converged ranging laser, and a laser receiver for transforming received optical signals into electrical signals.

10. The laser rangefinder having common optical path according to claim 9, wherein the emitting apparatus and the laser receiving apparatus share the same dichroic mirror and the same bandpass filter lens.

11. The laser rangefinder having common optical path according to claim 9, wherein the first holophote and the second holophote are arranged side by side in a same plane in front of and inclined to the laser emitter and the laser receiver respectively, the first laser focusing lens and the second laser focusing lens are respectively arranged over the first holophote and the second holophote, and the bandpass filter lens is arranged over the first laser focusing lens and the second laser focusing lens and parallel thereto.

12. The laser rangefinder having common optical path according to claim 11, wherein the bandpass filter lens is arranged on a bottom surface of the tubular body.

13. The laser rangefinder having common optical path according to claim 12, wherein the dichroic mirror is arranged over the bandpass filter lens, inclinedly fixed inside the tubular body of the laser module frame and divides an inner space of the tubular body into two parts.

14. The laser rangefinder having common optical path according to claim 9, wherein the reference point indicating apparatus comprises a light emitting diode for generating a visible indicating light, a grating filter that performs a function of limiting a size of an aperture for emitting the visible indicating light, a reflector for reflecting the limited visible indicating light, and a concave focusing lens for converging the visible indicating light into a real image point to form an indicating reference point.

15. The laser rangefinder having common optical path according to claim 14, wherein the concave focusing lens is arranged behind the dichroic mirror, the light emitting diode and the grating filter are arranged near a side of the concave focusing lens, and the reflector is arranged behind the light emitting diode and in a light path of the light emitting diode.

16. A laser rangefinder having common optical path comprising:
    a housing assembly; and
    a laser module received in the housing assembly, the laser module comprising: a frame having a tubular body, and a laser emitting apparatus, a laser receiving apparatus and a reference point indicating apparatus mounted in the frame,
    wherein a light path of the laser emitting apparatus and a light path of the laser receiving apparatus are configured to be independent to a light path of the reference point indicating apparatus, and an optical axis of the light path of the laser emitting apparatus shooting at a target object and an optical axis of the reference point indicating apparatus are collinear;
    the laser emitting apparatus comprises a laser emitter for emitting a laser beam which is arranged under a bottom side of the tubular body, a first holophote for reflection of the laser beam which is inclinedly arranged in front of the laser emitter, a first laser focusing lens for converging the laser beam to form a collimating ranging laser which is arranged above the first holophote, a bandpass filter lens for allowing the ranging laser to pass through but preventing natural light from passing through, and a dichroic mirror for reflecting the ranging laser and allowing the natural light to pass through; and
    the laser receiving apparatus comprises a laser receiver arranged under the bottom side of the tubular body adjacent to the laser emitter, a second holophote inclinedly arranged in front of the laser receiver at a side of the first holophote, a second laser focusing lens arranged above the second holophote, the dichroic mirror, and the bandpass filter lens.

17. The laser rangefinder having common optical path according to claim 16, wherein the bandpass filter lens is arranged on a bottom surface of the tubular body, and the dichroic mirror is arranged over the bandpass filter lens, inclinedly fixed inside the tubular body of the frame and divides an inner space of the tubular body into two parts.

* * * * *